Nov. 30, 1965 R. L. WHITNAH 3,220,664

ATTACHING MEANS FOR REELS

Filed Aug. 6, 1962

INVENTOR
RONALD L. WHITNAH

Carpenter, Abbott, Coulter & Kinney
ATTORNEYS

United States Patent Office 3,220,664

Patented Nov. 30, 1965

3,220,664

ATTACHING MEANS FOR REELS

Ronald L. Whitnah, White Bear Lake, Minn., assignor to Minnesota Mining and Manufacturing Company, St. Paul, Minn., a corporation of Delaware Filed Aug. 6, 1962, Ser. No. 215,113
5 Claims. (Cl. 242—74.1)

This invention relates generally to a reel adapted to be used in a tape recorder and relates more particularly to an improved fastening device for securing a tape at one end to the hub of a reel.

In the winding and/or holding of the end portions of flexible strips, such as ribbons, wire strands, tapes, bandage webbing, etc., there is a need for means to releasably clamp one end of a strip in place on the reel, spool or the like to prevent total unwind and to facilitate rewind of the strip material on the reel. This need is particularly acute on tape recorders and the like which are arranged to automatically feed tape from a supply reel onto a take-up reel at high speeds. As soon as all of the tape (web or wire) is unwound from the supply reel, the drive system of the recorder is automatically reversed and the tape is rewound on said supply reel. This imposes considerable stress on the means holding the tape end on the supply reel and there is a tendency for the tape end to pull out of the reel unless securely fastened thereto. Consequently, a simple and reliable fastening means is required which is capable of retaining one end of the tape on the reel to permit the tape to be rewound upon said reel.

It is, therefore, a principal object of the present invention to provide a fastening device which fulfills the above requirements, i.e., a device which firmly retains the end of a flexible strip such as a tape or the like to a holding or supporting member such as a spool or the hub of a reel.

A further object of the present invention is to provide a fastening means for rapidly and securely fastening flexible strip material including: webs, ribbons, tape, film, wire strands or the like to a core, reel or other supporting structure which does not require said strip to be preformed with a loop or the like to effect said fastening.

The above and further objects and novel features of the present invention will fully appear from the following detailed description when the same is read in connection with the accompanying drawings, wherein.

Figures 1, 2, 3, 4, 5, 6:
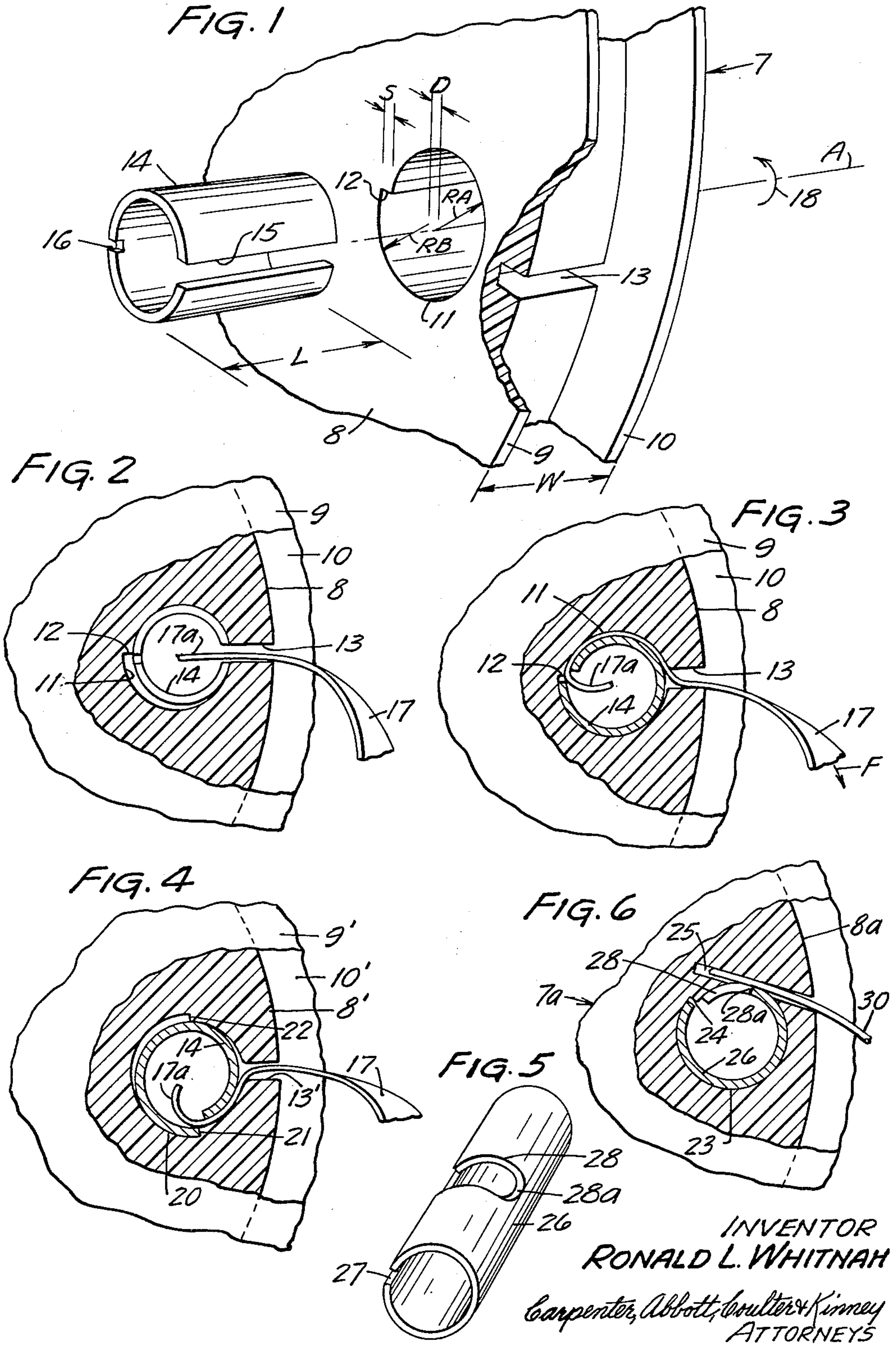
FIGURE 1 is a perspective view, partially broken away, of one embodiment of the present invention showing the parts in disassembled relation.
FIGURE 2 is a fragmentary elevational view of the embodiment of FIGURE 1 in assembled relation.
FIGURE 3 is a fragmentary elevational view of the embodiment of FIGURES 1 and 2 shown in the locked or fastened position.
FIGURE 4 is a fragmentary elevational view of a second embodiment of the present invention.
FIGURE 5 is a perspective view of a modified element of the present invention.
FIGURE 6 is a fragmentary elevational view of a third embodiment of the present invention.

Referring now to the drawing, and to FIGURE 1 thereof in particular, there is shown a reel 7 having a spool or hub portion 8 with flange portions 9 and 10. If desired, the reel 7 may be of one piece molded plastic or of separable members and is conventionally provided with a central opening (not shown) to receive therethrough a driving spindle (not shown). The hub portion 8 is preferably solid and has a bore 11 having an arcuate wall surface formed with a detent or axially extending internal shoulder 12. The bore 11 is positioned in the hub adjacent the annular surface upon which a strip may be wound. The bore 11 forms a part of the novel fastening means and extends through the hub 8 generally parallel with the principal axis of the reel 7.

The bore 11 is formed about two axes with the major portion of said bore being formed on a primary axis A. A substantial portion of the surface or wall defining said bore is described by a radius $R_A$ from the axis A and the remaining circumferential surface portion of said bore is described by a radius $R_B$ from an axis parallel to and laterally offset therefrom a distance D. The arcuate surfaces thus defined by said radii form the radially offset and axially extending detent or shoulder portion 12 within the bore 11.

In the preferred embodiment the radius $R_B$ is slightly greater than the radius $R_A$ to provide a radial dimension S for the shoulder 12 which exceeds the distance D between the axes about which the bore 11 is formed. As an illustrative example, when the fastening device is used with magnetic recording tape, the radius $R_A$ may have a dimension of between 0.046 to 0.048 inch, a radius $R_B$ between 0.052 to 0.054 inch, with the axes spaced a distance D equal to 0.008 inch, thus providing a radial shoulder dimension S of about 0.012 to 0.016 inch to provide a substantial relief or detent in the surface of the hub 8 defining said bore 11.

A strip receiving passage 13 is provided in the form of slot in the hub 8 communicating at its outer end with the outer periphery of the hub 8 between the flanges 9 and 10 and communicating at its inner end with the bore 11 formed in said hub 8. This passage 13 permits the insertion of one end of a web or strip 17 into the bore 11. The passage 13 has a dimension slightly greater than the dimension of the strip allowing easy insertion thereof through said passage.

The remaining structural element of the novel fastening device is a cylindrical clamping member such as the sleeve 14 formed of a resilient material such as metal or a suitably stiff, yet resilient polymeric material. The sleeve 14 has an aperture in the form of a slit 15 in the periphery thereof extending the length of said sleeve such that the sleeve is normally C-shaped in transverse section. A small notch 16 is formed in the wall of the sleeve adjacent one end, in a position diametrically opposed with respect to said slit 15. The sleeve 14 has a normal outer dimension slightly larger than the dimension of the bore 11 and is adapted to be compressed and telescopically inserted in snugly rotatable relation with the bore 11. The sleeve is inserted with the slit 15 thereof positioned adjacent and aligned with the passage 13 as shown in FIGURE 2.

In the preferred embodiment, the sleeve 14 has a diameter of approximately 0.099 inch and a wall thickness of 0.015 inch. The length L of the sleeve may be slightly greater than the overall width W of the reel 7. This added length of the sleeve makes easier the insertion of a sharp bladed tool (not shown) into the notch 16 and slit 15 to rotate the sleeve 14 in a counterclockwise direction relative to the hub as indicated by the arrow 18 in FIGURE 1.

A web fastening is effected by slightly compressing the resilient sleeve 14 and inserting said sleeve into the bore 11 with the slit 15 aligned with the slotted opening 13. One end of the strip 17 or article to be wrapped on the hub is then inserted through the passage 13 and through the slit 15, until the end portion 17*a* thereof is positioned within the hollow sleeve 14 as shown in FIGURE 2. The bladed tool is then inserted into the notch 16 and one end of slit 15 to rotate the sleeve counterclockwise. As the sleeve 14 is rotated the strip 17 is drawn through the opening 13 and wraps upon the outer cylindrical surface of said sleeve. When the clamping sleeve is rotated approximately 180°, the upper segment of the sleeve as viewed in FIGURE 3 frictionally binds the strip 17 against the surface of the hub 8 defining the bore 11. As the web is wrapped upon the sleeve the upper segment thereof is constricted to a greater degree in the bore 11 increasing the compressive force placed on the portion of said sleeve within the upper arcuate portion of the bore 11. This increased force plus the initial compressive force placed on the sleeve 14 causes a lip of said sleeve or the leading edge of the cylindrical wall defining the slit 15 to snap into the recessed area beneath the shoulder 12, such that said lip is in engagement therewith. This deformation of the sleeve frictionally engages the strip 17 with the arcuate surface of the bore 11 and the shoulder 12 prevents free rotation of the sleeve in a clockwise direction to dislodge said strip. The fastening device thus tightly secures the end of the strip 17 to the hub 8 such that when a pulling force in the direction of arrow F (see FIG. 3) is applied to said strip, the sleeve 14 cannot rotate to free the end of said strip.

Referring now to FIGURE 4 there is shown a modified form of the fastening means of FIGURES 1 to 3. In this embodiment the bore 20 in the hub 8' is formed with two circumferentially spaced shoulder portions 21 and 22. The bore 20 is formed about a single axis with approximately one-half of the circular bore being formed by an arcuate wall portion having a larger radius of curvature than the arcuate portion thereof adjacent the opening 13' communicating with the periphery of the hub 8'. The shoulders 21 and 22 thus formed may be circumferentially spaced between 60° to 120° from the passage 13' and preferably have a radial dimension which will equal or slightly exceed the wall thickness of the sleeve 14 used therewith. This fastening device allows the sleeve 14 to be rotated in either a counterclockwise direction or a clockwise direction to frictionally hold the strip 17 to the hub 8 when the sleeve expands into engagement with the respective shoulder 21 or 22.

In FIGURES 5 and 6 a further modified form of the novel fastening device is illustrated for use with a strip 30 of wire, cable, cord or the like. In this embodiment the bore 23, formed in the hub 8a is similar to the bore 11 shown in FIGURES 1 to 3, and is provided with an axially extending shoulder 24. A strand receiving passage 25 is formed in the hub 8a of a reel or spool 7a and extends substantially tangential to the arcuate wall surfaces of the hub defining the bore 23. The passage 25 communicates at one end with the peripheral surface of the hub 8a and communicates intermediate its length with the bore 23.

The clamping member 26, shown in FIGURE 5, used with this fastening device is a hollow resilient, open ended sleeve having a slit 27 formed in the periphery thereof.

The slit 27 extends the full length of the sleeve, as in the sleeve 14 and is formed with an additional opening 28 in the periphery thereof positioned intermediate its length. The opening 28 extends circumferentially into the wall of the sleeve from the slit 27 forming a larger aperture than that in the sleeve 14.

The fastening of the strand 30 to the reel 7a is effected by slightly compressing the resilient sleeve 26 and inserting the same in the bore 23. The member is positioned such that the opening 28 communicates with the strand receiving passage 25 leaving said passage unobstructed. The end of the strand 30 is then inserted into the passage 25 and through the opening 28 to a position beyond the area where said passage communicates with the bore 23. A tool is then used to rotate the cylindrical member 26 in a counterclockwise direction, as shown in FIGURE 6, to bring the edge 28a of the opening 28 into engagement with the strand 30. This edge 28a engages the strand and frictionally binds the strand between said edge and the surface of this hub 8a defining the passage 25. The continued rotation increases this frictional engagement until a lip of the cylindrical member 26 snaps radially outward beneath and into engagement with the shoulder 24. The shoulder 24 prevents the clockwise rotation of the sleeve 26 to secure the strand 30 to the hub.

The illustrated locking or fastening devices may be released by applying force to a tool engaged with the slit in the respective cylindrical clamping members or by compressing the member to allow the lip portion thereof engaging the shoulder to rotate past said shoulder. The fastening is, however, otherwise secure and will not release the end of the web 17 or strand 30.

What is claimed is:

1. Means for attaching one end of a flexible strip to a spool having an annular winding surface and having formed therein an axially extending opening defined by a first semicylindrical surface of a given radius and a second semicylindrical surface of a different radius tangential to said first surface to provide an axially extending radially offset shoulder, and having means defining a passage extending through said winding surface to said opening at an area arcuately offset from said shoulder, a cylindrical open-ended resilient clamping member formed with an aperture in its periphery, said member being telescopically received in snugly rotatable relation within said opening and adapted to align said aperture with said passage whereby, when one end of a strip is fed through said passage and said aperture, said member may be rotated to lock the strip to the spool upon rotation of the member until the aperture coincides with said shoulder.

2. A means as described in claim 1 wherein said passage extends generally tangential to one of said semicylindrical surfaces.

3. A strip supporting member and fastening means comprising an annular hub having a bore defined by arcuate surfaces of varying radii extending essentially parallel to the axis of said hub and including a pair of axially extending radially offset shoulder portions joining said arcuate surfaces of said hub defining said bore, and means in said hub defining a passage extending transverse to said bore and arcuately offset from said shoulder portions providing access to said bore from the periphery of said hub, a cylindrical resilient open-ended clamping member, having a slit formed in the wall thereof from end to end, telescopically received in snugly rotatable relation within said bore and adapted to receive within its slit one end of a strip fed through said passage and adapted to frictionally bind one end of a fed strip between the peripheral surface of said member and an arcuate surface of said bore to lock the strip to the hub when said slit is rotated to a position adjacent one of said shoulders.

4. A strip supporting and fastening means comprising an annular hub having a bore defined by arcuate wall surfaces of varying radii extending essentially parallel to the axis of said hub and including at least one axially extending radially offset shoulder portion joining said arcuate surfaces of said hub defining said bore, and having means defining a passage extending transverse to said bore and arcuately offset from said at least one shoulder portion providing access to said bore from the periphery of said hub; and a cylindrical resilient open-ended clamping member, having a slit formed in the wall thereof from end to end, telescopically received in snugly rotatable relation within said bore and adapted to receive within its slit one end of a strip fed through said passage and adapted to frictionally bind one end of a fed strip between the peripheral surface of said member and an arcuate surface of said bore to lock the strip to the hub when said slit is rotated to a position adjacent said at least one shoulder.

5. Means for clamping the end of a flexible strip in place, said means comprising a resilient clamping member of generally cylindrical configuration being formed with a slit in the wall thereof extending from end to end of said clamping member, and a holding member having its exterior surface opening inwardly to define a bore having an arcuate wall surface, said holding member being formed with stop means in the arcuate wall surface thereof and having a passage communicating with said exterior surface and said bore intermediate the ends of said bore, said clamping member being inserted within and having a snug frictional engagement with said arcuate wall surface of said bore and having said slit aligned with said passage to receive one end of a flexible strip inserted there-through, said stop means being positioned in said bore in circumferentially spaced relation with respect to said passage and cooperating with said slit after the clamping member has been rotated in a predetermined direction, said stop means engaging the edge of the wall of said clamping member defining said slit that is leading in said predetermined direction of rotation to restrict rotation of the clamping member in the reverse direction.

References Cited by the Examiner

UNITED STATES PATENTS

| | | | |
|---|---|---|---|
| 1,209,593 | 12/1916 | Keiser | 242—74.1 |
| 1,578,231 | 3/1926 | Deses et al. | 242—74.1 |
| 2,180,023 | 11/1939 | Tucker | 242—74.1 |

MERVIN STEIN, *Primary Examiner.*

RUSSELL C. MADER, *Examiner.*